United States Patent
Koselka et al.

(10) Patent No.: US 8,359,122 B2
(45) Date of Patent: *Jan. 22, 2013

(54) AUTONOMOUS PERSONAL SERVICE ROBOT

(75) Inventors: Harvey Koselka, Trabuco Canyon, CA (US); Bret Wallach, San Diego, CA (US); David Gollaher, San Diego, CA (US)

(73) Assignee: Vision Robotics Corporation, San Diego, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/675,267

(22) Filed: Feb. 15, 2007

(65) Prior Publication Data

US 2007/0198129 A1 Aug. 23, 2007

Related U.S. Application Data

(63) Continuation of application No. 11/090,356, filed on Mar. 26, 2005, now Pat. No. 7,228,203.

(60) Provisional application No. 60/521,292, filed on Mar. 27, 2004.

(51) Int. Cl.
*G06F 19/00* (2011.01)
*G05B 19/08* (2006.01)

(52) U.S. Cl. ........ 700/245; 700/246; 700/250; 700/254; 700/260; 700/261

(58) Field of Classification Search .......... 700/245, 700/246, 250, 254, 260, 261, 262; 318/568.12; 901/1, 2; 701/188; 340/573.1, 286.01
See application file for complete search history.

(56) References Cited

U.S. PATENT DOCUMENTS

| | | | |
|---|---|---|---|
| 5,802,494 A * | 9/1998 | Kuno | 705/2 |
| 6,430,475 B2 * | 8/2002 | Okamoto et al. | 700/245 |
| 6,580,970 B2 | 6/2003 | Matsuda | |
| 6,604,021 B2 | 8/2003 | Imai | |
| 6,658,325 B2 * | 12/2003 | Zweig | 700/245 |
| 6,925,357 B2 * | 8/2005 | Wang et al. | 700/245 |
| 7,047,105 B2 | 5/2006 | Kakutani | |

(Continued)

FOREIGN PATENT DOCUMENTS

JP  2001129787 A1  5/2001

OTHER PUBLICATIONS

B.J. Frost, Eye Movements in Daphnia Pulex (De Geer), 1975, Internet. p. 175-187.*

(Continued)

*Primary Examiner* — Ian Jen
(74) *Attorney, Agent, or Firm* — ARC IP Law, PC; Joseph J. Mayo

(57) ABSTRACT

Autonomous personal service robot to monitor its owner for symptoms of distress and provide assistance. The system may include sensors to detect situations before they affect people such as smoke, heat, temperature and carbon monoxide sensors. The system can provide security for the home. The PRA may comprise features such as a medicine dispenser and blood pressure cuff. Features such as broadband internet, MP3 player, reading lights and eye glass tracker provide butler type capabilities that enable the system to appeal to markets beyond the elderly and infirmed. The system may also include an X10 transmitter/receiver to automatically control various household lights and appliances. Equipping the system with a robot arm enables the robot to fetch items, turn on and off wall switches and open the refrigerator.

19 Claims, 5 Drawing Sheets

Monitoring PRA with Limited Features

U.S. PATENT DOCUMENTS

| | | | |
|---|---|---|---|
| 7,054,718 B2 | 5/2006 | Miyamoto et al. | |
| 7,164,969 B2* | 1/2007 | Wang et al. | 700/245 |
| 7,218,992 B2* | 5/2007 | Wang et al. | 700/245 |
| 7,222,000 B2* | 5/2007 | Wang et al. | 700/259 |
| 7,228,203 B2* | 6/2007 | Koselka et al. | 700/245 |
| 7,237,298 B2* | 7/2007 | Reindle et al. | 15/319 |
| 7,262,573 B2* | 8/2007 | Wang et al. | 318/568.12 |
| 7,289,883 B2* | 10/2007 | Wang et al. | 700/245 |
| 7,292,912 B2* | 11/2007 | Wang et al. | 700/259 |
| 7,298,871 B2* | 11/2007 | Lee et al. | 382/115 |
| 7,313,467 B2* | 12/2007 | Breed et al. | 701/1 |
| D579,035 S * | 10/2008 | Kim et al. | D15/199 |
| 7,720,572 B2* | 5/2010 | Ziegler et al. | 700/245 |
| 7,957,837 B2* | 6/2011 | Ziegler et al. | 700/258 |
| 8,116,910 B2* | 2/2012 | Walters et al. | 700/259 |
| 2001/0037163 A1* | 11/2001 | Allard | 700/245 |
| 2002/0198626 A1* | 12/2002 | Imai et al. | 700/245 |
| 2003/0227439 A1* | 12/2003 | Lee et al. | 345/156 |
| 2004/0019406 A1* | 1/2004 | Wang et al. | 700/231 |
| 2004/0040086 A1* | 3/2004 | Eisenberg et al. | 5/81.1 R |
| 2004/0117065 A1* | 6/2004 | Wang et al. | 700/245 |
| 2004/0143421 A1* | 7/2004 | Wang et al. | 702/188 |
| 2004/0162637 A1* | 8/2004 | Wang et al. | 700/245 |
| 2004/0164858 A1* | 8/2004 | Lin | 340/522 |
| 2004/0167666 A1 | 8/2004 | Wang | |
| 2004/0167668 A1* | 8/2004 | Wang et al. | 700/248 |
| 2004/0202351 A1* | 10/2004 | Park et al. | 382/104 |
| 2005/0071047 A1* | 3/2005 | Okabayashi et al. | 700/245 |
| 2005/0091684 A1* | 4/2005 | Kawabata et al. | 725/35 |
| 2005/0215171 A1* | 9/2005 | Oonaka | 446/301 |

OTHER PUBLICATIONS

Stephenson, Dr. Robot Tested at Hopkins, 2003, Internet, p. 1.
Maxwell, et al., Alfred The Robot Waiter Who Remembers You, 1999, Internet, p. 1-12.
European Search Report, dated Oct. 27, 2008.
International Search Report, dated Oct. 20, 2005.
Wong, C et al: "A mobile robot that recognizes people" Proceedings of the 7th International Conference on Tools with Artificial Intelligence. Herndon, VA., Nov. 5-8, 1995; [Proceedings of the International Conference on Tools with Artificial Intelligence], Los Alamitos, CA: IEEE Computer Soc, US. Nov. 5, 1995, pp. 346-347; figure 1.
Engelhardt, K.G.: "An Overview of Health and Human Service Robotics" Robotics and Autonomous Systems, Elsevier Science Publishers, Amsterdam, NL, vol. 5, No. 3, Nov. 1, 1989, pp. 205-226, XP000081385 ISSN: 0921-8890, paragraph [2.11].
Kawamura, K. et al.: "Trends in service for the disabled and the elderly" Intelligent Robots and Systems '94. 'Advanced Robotic Systems and the Real World', IROS '94. Proceedings of the IEEE/RSJ/GI International Conference on Munich, Germany Sep. 12-16, 1994, New York, NY, USA IEEE, vol. 3, Sep. 12, 1994, pp. 1647-1654, XP010241985 ISBN: 978-0-7803-1933-2, p. 1650.
Kwolek, B: "Color vision based person following with a mobile robot" Robot Motion and Control, 2002. Romoco '02. Proceedings of the Third International Workshop on Nov. Sep. 11, 2002, Nov. 9, 2002, pp. 375-380, XP010630976 ISBN: 978-83-7143-429-7.

\* cited by examiner

Monitoring PRA with Limited Features

Small Form Factor PRA

Block diagram of PRA operational concept

Block diagram of algorithms for visually identifying and monitoring a person

| |
|---|
| Monitoring functions to track its owner and learn his/her lifestyle and habits in order to determine whether something out of the ordinary has occurred such as the owner remaining in bed late into the morning.<br>• Track owner as they move throughout the house<br>• Identify the owner from multiple people to maintain monitoring<br>• Determines whether the owner is sitting or lying someplace unusual<br>• Detects motion to determine if person has remained stationary for too long<br>• Uses cameras to watch for problems<br>• Responds to emergency cries      501<br>• Medic alert<br>• Wireless link for photographs health & safety issues to relatives<br>• Reminds owner to eat at specified times, to use bathroom, go to bed, etc. |
| Medical features<br>• Medicine dispenser<br>    o 7-14 or more or less days worth of medicine can be loaded into individual chambers with timing programmed. Delivers medicine at the correct time and prompt owner until he/she takes medications. After sufficient time, robot will call contact and inform them that owner did not take medications.<br>    o Monitor medication compliance<br>• Perform medical testing such as dementia testing, blood pressure testing, blood sugar testing |
| Telephone<br>• Answering machine<br>• 911 emergency dialer / Emergency contact dialer      503<br>• Call screener<br>• Calendar/other personal functions |
| Sensors / household safety<br>• Thermometer – The robot will detect when the room temperatures become too hot or cold and notifies the appropriate contacts.<br>• Smoke detector, Carbon monoxide detector<br>• Motion detector to act as security system      504<br>• Patrol house using cameras<br>• Emergency light<br>• Heat detector determines if stove or oven is left on, Mobile self actuating fire extinguisher<br>• Alarm |
| Convenience<br>• Tray top will enable robot to transport food or other items enabling owner to walk freely<br>• Reading light<br>• Speech recognition to respond to verbal commands<br>• Wireless internet connection      505<br>• X10 connection<br>• Bluetooth connection<br>• Radio<br>• Download and play audio-books<br>• Tracking objects<br>    o Small RF tags may be adhered to various objects such as glasses, remote controls, bookmarks, etc., which the PRA will locate when requested. |
| Arm<br>• Object fetcher – in addition to tracking the location of objects such as glasses, books and remote controls, the PRA3 can pick-up the article and take it to the owner.<br>• Turn on and off wall switches lights      506 |

Figure 5
Partial List of PRA Features

PRA with an Integrated Arm

AUTONOMOUS PERSONAL SERVICE ROBOT

This application is a continuation of U.S. Utility patent Ser. No. 11/090,356 filed Mar. 26, 2005 now U.S. Pat. No. 7,228,203 which claims benefit of U.S. Provisional Patent application 60/521,292 filed Mar. 27, 2004, the specifications of which are both hereby incorporated herein by reference.

BACKGROUND OF THE INVENTION

1. Field of the Invention

Embodiments of the invention described herein pertain to the field of robots. More particularly, but not by way of limitation, one or more embodiments of the invention enable an autonomous personal service robot to monitor and attend to people such as the elderly or disabled and report their status and the status of their living environments.

2. Description of the Related Art

Virtually everyone wants to enjoy the highest possible quality of life. Increasing household conveniences is one method to improve home life for many people. For others, such as the elderly, simply being able to live independently in their own homes is their desire.

Refrigerators, washing machines, dish washers and microwave ovens represent a small fraction of the convenience appliances in many homes. Yet, there remain many tasks to automate such as: fetching the newspaper; getting a drink from the refrigerator; or locating the missing telephone receiver or television remote control. While these and many other similar tasks seem mundane, none-the-less, many people would enjoy a personal attendant or butler that provides these services.

Most people want to be able to choose where and how they live. However, as people age, they often lose this choice and are forced to live in assisted care or nursing homes. The ability to live independently in comfortable surroundings is important both because it improves the mental wellbeing of the individual and because of the high cost of care. This prized independence is often only grudging relinquished as health concerns, diminished capacity and the fear being unable to respond to crisis forces individuals to accept increasingly higher levels of living assistance. As well as financial strain, reduced confidence and unhappiness often accompanies this decreased independence.

Many people who can handle the day-to-day activities of living alone are forced into assisted living or nursing homes because they cannot handle emergencies. The person can cook, clean, etc. but might not be able to get up if they fall in the middle of a room. Other people need to be monitored for different medical conditions. These people are robbed of their independence because of what might happen. This problem is exacerbated by today's demographics where the aging live far from relatives, including their children, so daily monitoring is either expensive or not available.

Emergency stations and "Medical Alarms" integrated into necklaces connected to monitoring service providers exist, but are not overwhelmingly received. Two problems are that the products can be invasive, and that they are only useful in some conditions. A push button alarm does not work if their owner loses consciousness, and a motion sensor might give false readings if the owner is napping.

Currently, nurses and other caregivers monitor some elderly in their homes. The cost of nursing care is high, and rising, while the supply will soon experience a shortage. Automating tasks such as medicine dispensing and compliance monitoring, dementia testing, and monitoring for falls and other emergency conditions decrease the tasks for which caregivers are required, but such solutions do not currently exist.

For at least the limitations described above there is a need for system that provides the functions of an autonomous personal robot that enables the disabled or elderly to remain independent as long as possible while providing automated twenty-four hour support that will improve the quality of life while significantly decreasing costs.

BRIEF SUMMARY OF THE INVENTION

One or more embodiments of the invention enable an autonomous personal service robot to monitor and attend to people such as the elderly or disabled and report their status and the status of their living environments. Embodiments of the invention comprise advanced robotics using vision-based mapping technology to revolutionize the care of people with disabilities, the aged and infirmed. A Personal Robotic Assistant (PRA) can provide monitoring and other assistance and enables its owner to live independently longer.

The PRA can monitor its owner for symptoms of distress and provide assistance in a variety of tasks. In order to gain wide acceptance, the PRA is designed to be foolproof, non-threatening, extremely user friendly and self contained. The only hardware setup required when the robot is unpacked is the plugging-in of the base/charging station to the wall, plugging in the base station's telephone line and positioning the PRA at the charger so it can take its first battery charge. There may be some initial data entry including contact and emergency telephone numbers. Digital cameras enable the robot to track the person being monitored based on vision, gate and clothes recognition. Objects may be tracked and retrieved as well. RF tags may be attached to objects (glasses, keys or the TV remote control) that the person might want located and have brought to them. Once the unit is charged, it moves autonomously to explore and map its environment and begins its job as a faithful servant.

As a programming option, the PRA may either retreat to become inconspicuous when not performing a task or remain at its owner's side. In one embodiment, the robot resembles a piece of furniture whose shape provides function. For example, the robot may be configured as a small cart, or a TV tray type table on wheels, and may include a robotic arm similar in size to a clamp type desk lamp.

Vision is the best navigation sensor for robots because of its low cost and versatility. The vision system of the PRA may be coupled with bumpers, active beacons, ultrasonics and other sensors to improve performance based on a specific robot's needs. The vision system includes the three dimensional (3D) technology for precision movement, collision avoidance and accurate tracking of the patient. In addition, this functionality is suitable for remapping in instances where objects shift or are removed from a room, such as chairs around a dining room table.

The robot recognizes basic household furniture such as chairs, couches and beds, and classifies rooms in the course of its mapping activity. This knowledge improves the robots functionality for many tasks. One task of monitoring is to determine when something unusual occurs. Depending on the person, laying down in the bedroom for a short nap may be normal, while laying on the couch or floor of one of the other rooms indicates a problem. Similarly, if the robot is sent to get a soda, it should know that the best place to find the drink is in the refrigerator. To communicate with the owner, the robot may employ both a LCD screen and voice activated user interface and may include a remote control.

In addition to monitoring people, the PRA may include sensors to detect situations before they affect people. For example, the robot may be configured with smoke, heat, temperature and carbon monoxide sensors. Locating these sensors on the robot is an improvement over sensors distributed through the house because the PRA may be configured to be located near its owner. In addition, the PRA can provide security for the home.

Adding features such as a medicine dispenser and blood pressure cuff increase the PRA's care-giving capabilities. Features such as broadband internet, MP3 player, reading lights, eye glass tracker, etc., provide butler type capabilities that enable the PRA to appeal to markets beyond the elderly and infirmed. The PRA may also include an X10 transmitter/receiver to automatically control various household lights and appliances.

Equipping the PRA with a robot arm enables the robot to fetch items, turn on and off wall switches, open the refrigerator, etc. These tasks may be difficult for the elderly, thus are essential to enable them to live independently longer. For the healthy, the arm provides another degree of convenience.

BRIEF DESCRIPTION OF THE DRAWINGS

FIG. 5 is a table listing many of the potential monitoring, medical and convenience features.

DETAILED DESCRIPTION OF THE INVENTION

An autonomous personal service robot will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
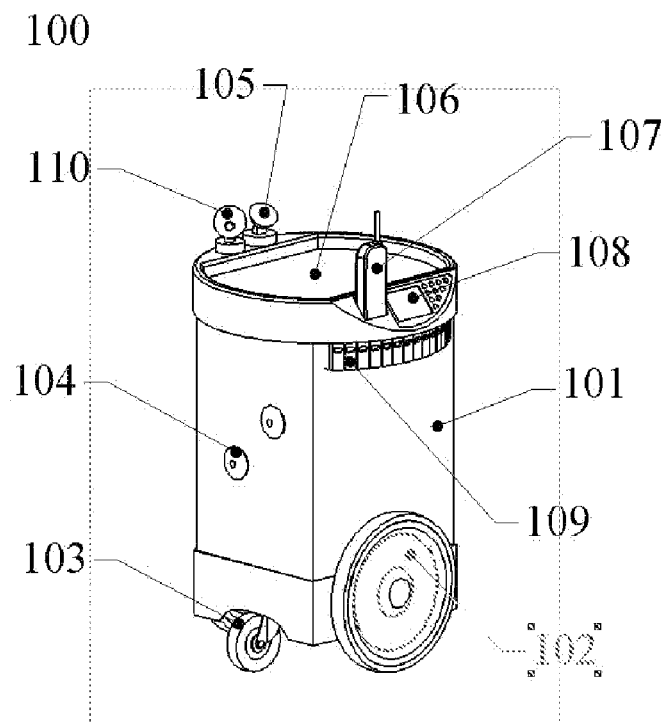
FIG. 1 is a drawing of one embodiment of the monitoring version of the PRA with some enhanced functionality.

Referring to FIG. 1, one embodiment of the PRA includes basic monitoring functions with limited safety and convenience features. PRA 100 includes frame 101 which may be either open or closed. The figure shows a closed design, which hides most of the robot's inner workings. This represents a simpler design which may appeal to certain groups. A more open design will give easier access to the robot's components and provide space for additional features included in other embodiments. The housing may be plastic, wood, metal or other appropriate materials. The basic design could be made to look like furniture to blend into a typical home; high tech or futuristic; or anthropomorphic to better convey the idea of a companion. The design and shape of each PRA is based on the target market. In one embodiment, the PRA is round when looking at it from the top. This shape enables the robot to turn in place enabling it to get out of any position and minimizing the chance for it to get stuck. Other shapes may also be used, but use different navigation software and algorithms.

Another factor affecting the overall shape is stability. If the robot is tall it may be prone to tipping over if people lean on it. Such an embodiment may utilize weight near the base or a drive system optimized for stability. Larger robots are more stable and have space to house various features, but a larger size makes it more difficult to navigate through cluttered rooms or narrow openings. Users of the system may therefore opt for one model over the other based on their particular environment.

The drive system includes two independent drive wheel assemblies 102 located symmetrically on either side and at the center of the robot. Each drive wheel operates independently enabling the robot to move forward and backward. If they are turning in opposite directions, the PRA rotates in place. If they are going in the same direction, but at different speeds, the PRA turns along an arc. This embodiment uses one or more casters or skid plates 103 to provide stability. Each wheel is large enough to enable the PRA to climb the thresholds and floor transitions in a typical house. The wheel itself may be a single part, an assembly including a hub and a rubber rim or any other wheel configuration. Each wheel is turned by an electric motor powered by a battery, not shown. Alternatively, the robot could be powered by a fuel cell or other means. Utilizing a two drive wheel system enables the PRA to turn in place, further minimizing the chances of getting stuck.

A typical automotive or remote control car drive system uses a single motor to spin two wheels (either the front or the rear) while a second, motor or servo turns the wheels around the vertical axis. This and other drive configurations may also be used on the PRA. While being simpler to implement, this configuration does not have as much maneuverability as the two drive wheel configuration. Alternatively, treads can be used instead of the drive wheels and casters in a design similar to a tank.

Another embodiment may utilize a drive mechanism known as a holonomic drive wheel system. This system is a three drive wheel system using "Omni Wheels" where each wheel is located at 120 degrees relative to the other wheels and is driven by a motor. An omni-wheel is a wheel that can turn around two perpendicular axes simultaneously. Transverse spinning mini-wheels are arranged around the perimeter of the main angle of motion. These side spinning wheels enable the main wheel to spin in a direction other than the direction of motion without dragging. Using proper control algorithms, the three wheels can be used to make the vehicle go in virtually any direction including directly sideways. Regardless of the specific drive implementation, the system may further comprise providing encoder data, indicative of movement of the PRA.

The PRA uses CMOS or CCD cameras as sensors to "see" the environment. In one or more embodiments, the PRA uses one pair of stereo cameras 104. Multiple pairs of cameras may be used in other embodiments. Adding cameras increases the amount of information the navigation system can use when navigating, which might enable it to better map and manipulate through cluttered areas. The cameras in this embodiment are rotated 45 degrees with respect to the PRA's direction of travel, roll. One or more embodiments of the invention may utilize a single camera, or may utilize a pair of cameras horizontally mounted, vertically mounted or mounted at any angle between horizontal or vertical (between 0 and 90 degrees) with respect to the horizontal. The benefit of the angled axis feature is described in the inventors co-pending application Ser. No. 10/710,512 entitled "Angled Axis Machine Vision System and Method", which is hereby incorporated herein by reference. In addition, the PRA system may include a base-station, not shown. This robot docks on the base-station, which is plugged into the wall to charge. In addition, the base-station may include a connection to the internet or a wireless telephone base. The base station may comprise inductive charging allowing for the PRA to locate itself on or near the base station and charge without physically connecting to the base station through a hard wire connection.

One embodiment of the PRA includes reading light 105. The robot may also use this light to help it navigate through dark rooms. The top of PRA 106 in this embodiment is a tray, which may be used by its owner to transport objects. For example, an elderly or disabled person might be able to make a meal or a snack, but may be unable to carry it to a different room if they use a walker or wheel chair. In this embodiment the user may place food on the tray, and the PRA then may follow the user to a dining area. Other people might use this feature because they have too much for them to carry in one trip. The PRA may also comprise telephone 107. This is one means for the robot to communicate with the owner's family, doctors or emergency services.

The PRA comprises user interface (UI) 108 for communicating with its owners. The UI may include a pixel-type LCD screen capable of showing pictures or video, or just a text display. It may also include a speaker for voice communication. In order to input commands, the UI may use a microphone and voice activated controls, a touch screen or a keypad. The display and speakers may be used for functions other than just controls such as showing television or videos or for reading audio books. The PRA may include safety, medical or convenience features such as medicine dispenser 109 shown in the figure.

In addition to the cameras used for navigation, the PRA may include one or more additional cameras 110 to track and monitor its owner. These cameras identify a person using algorithms to recognize the owner's face, gate, clothes, voice, routines, etc, and track them as they move throughout the house. It is important for the robot to be able to identify and track its owner if there are multiple people in the house. For example, these software routines enable the PRA to determine whether it is the owner or the guest that has left. If the owner remains, everything runs as normal. If the owner leaves, the owner's routines and schedules that the PRA has learned are not applicable to the remaining individual and the system may be programmed not to track them at all.

While the navigation cameras may track the person, dedicated cameras may be located in a better position to see the person. Such a position may be higher than the navigation cameras as in the embodiment shown in the figure. The cameras may also use a different focal length or include an adjustable zoom to enable the PRA to accurately track the person from a variety of distances. In addition, the dedicated cameras may move, rotate and look up-an-down, so it can keep the person without having to move the entire robot. In addition, the user may utilize an RFID tag in order to aid in the tracking of the user.

Environmental conditions may affect both the navigation and monitoring cameras' ability to analyze images to extract information. Various features enhance the robot's functional ability in these conditions. For example, a light enables the robot to better see in the dark. The robot could include an infra-red light which is invisible to humans. The PRA could shine this light at their owner to add in tracking and monitoring without blinding them.

Another condition which may impair the robot's performance is when the environment includes both very bright and very dark areas, which can overwhelm the dynamic range of digital cameras and other image sensors. The robot will have difficulty recognizing its owner if they are sitting in front of a light or bright window, which is something people like to do. The PRA may incorporate algorithms described in the inventor's pending patent application Ser. No. 10/100,221 entitled "System and Method to Increase the Effective Dynamic Range of Image Sensors" which is hereby incorporated herein by reference.

The robot also includes both high level and low level electronics, not shown. The high level electronics could be a standard personal computer, other micro-processor, DSP or other system enabling the PRA to process the information from the cameras and other sensors for navigation, monitoring and task performance. The processor may be internally mounted in the frame of the PRA or externally located and communicate through a communications interface coupled with the PRA. The low level electronics may include a Pic or other micro-processor to control individual mechanical features such as providing a pulse width modulating PWM signal the power to enable the drive mechanism to work at a variety of speeds; to turn on and off lights; to read encoder information from the wheels; etc. In another embodiment, the high- and low-level electronics are incorporated into a single electrical package. In still another embodiment, a remote personal computer networked to the PRA performs the functions of the high level electronics.

Figure 2:
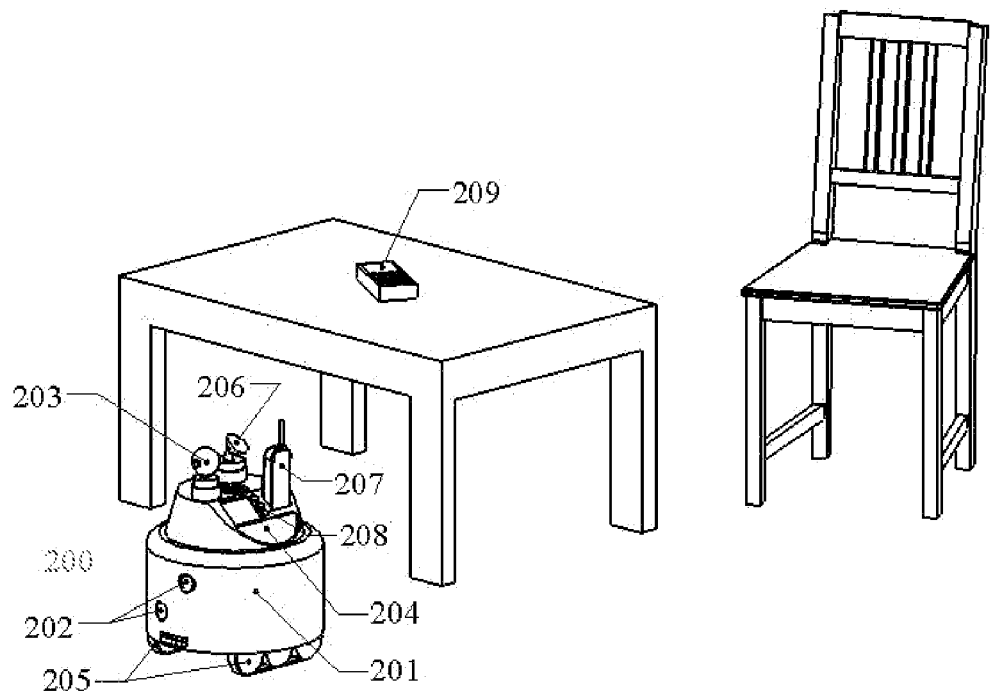
FIG. 2 is a drawing of a small, monitor only version of a PRA.

FIG. 2 shows an alternative embodiment for a monitoring-only PRA. This embodiment 200 includes a housing 201, and stereo cameras for navigation 202, a camera for tracking the owner 203 and a user interface 204. While the embodiment shown in FIG. 1 is approximately the size of a small table, roughly 18 inches in diameter and 24-36 inches tall, the embodiment shown in FIG. 2 is significantly smaller, roughly 14 inches in diameter and 12 inches tall. The small size makes it more maneuverable through a house and enables the robot to be less intrusive because it could position itself virtually out of sight. This embodiment employs a tread system 205 instead of wheels, but, like the larger version, could incorporate any of several different drives. The smaller PRA also has a light 206 and a telephone 207. Because the robot is small, it relies on voice communication and has a powered speaker 208 and a remote control 209 which the owner may carry. The smaller PRA also recharges at its base-station, not shown.

Sensitized bumpers or touch sensors may be incorporated either partially or totally around the perimeter of the PRA and may extend its full height, length and width. The bumpers detect whether the robot runs into an object in the room. These touch sensors or other sensors, which may be incorporated into the PRA, serve to augment the camera system by providing additional information regarding the environment, the owner or the state of the PRA to aid in mapping, tracking, navigation and task performance.

Figure 3:
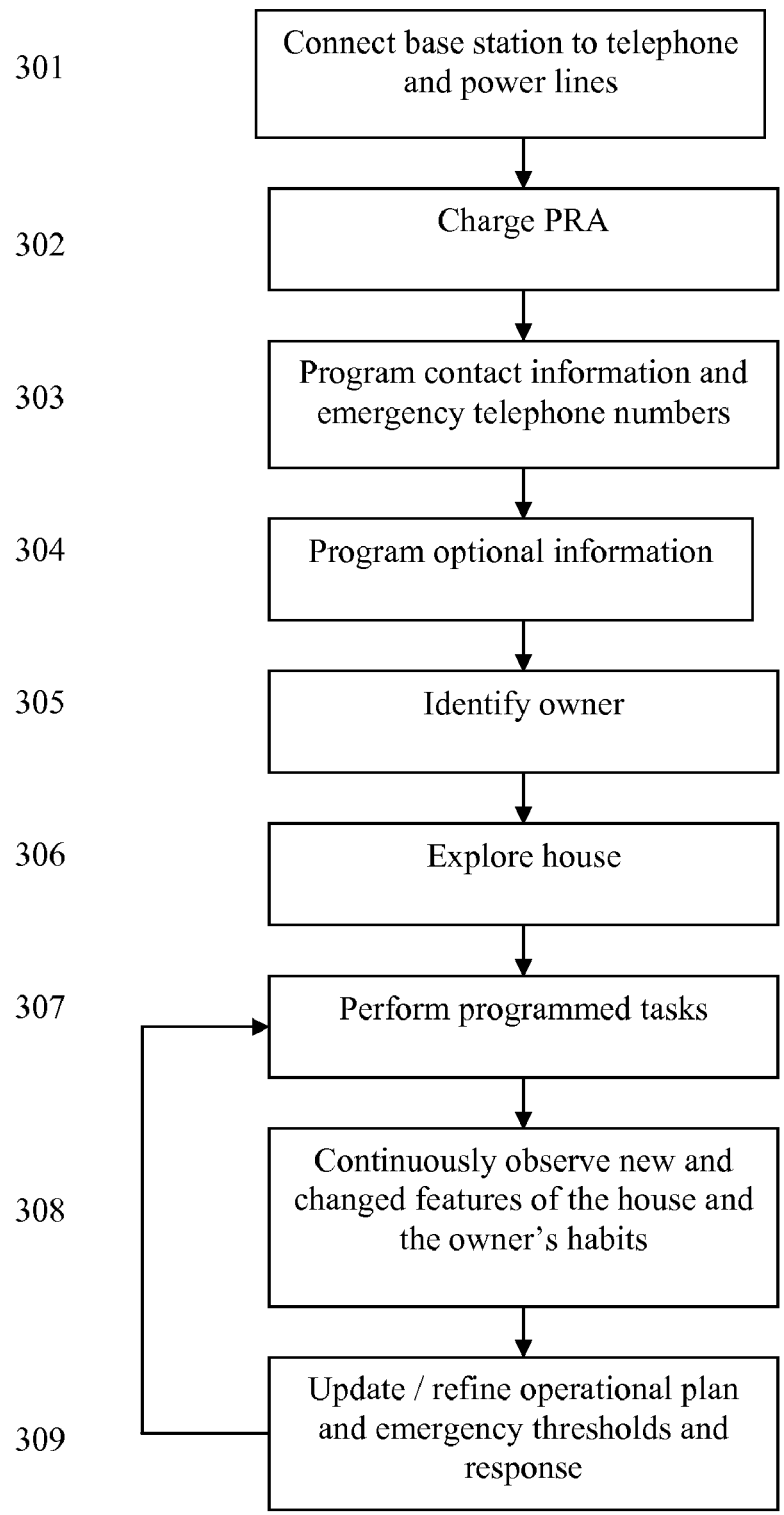
FIG. 3 is a block diagram describing the basic setup of the PRA

In order to appeal to some of the elderly population, the PRA is extremely user friendly, non-threatening and easy to install. The setup procedure is shown in FIG. 3. In one embodiment, the robot monitoring system comes in two parts, the PRA and the base-station. The hardware setup comprises connecting the base station to a power plug and telephone outlet 301 and positioning the PRA on the base-station to charge 302. Other embodiments that derive power without a base station are in keeping with the spirit of the invention and these embodiments may comprise use of a wireless link on the PRA instead of directing communications through a base station. The user programs emergency contacts such as family members or doctors 303 either into the base station or into the PRA depending on the embodiment. Depending on the features included in the PRA, there may be no other setup required. However, some optional features may also require setup and programming 304, for example if the system includes a medicine dispenser it must be filled and the schedule programmed, or RF tags may attached to remote controls, glasses, books or other objects that may be tracked or retrieved by the robot. The PRA may include X10 or Bluetooth capability to control household lights and appliances that may also require programming.

In an alternative embodiment, the owner wears a radio frequency tag or other beacon to identify themselves to different sensors. In this embodiment, the algorithms required to track the owner are significantly simpler and the robot may be less expensive. However, the beacons become more invasive whether they are a necklace, pin, bracelet or other object, which the owner may either forget or elect not to wear. During setup, these beacons must be put on by the owner.

Once the robot is charged, it will learn to identify its owner 305, begin to explore the house 306 and begin general operation including tracking and monitoring its owner 307. Exploration is the process by which a representation of the environment is created and updated from sensor data and preprogrammed input. There are many well-known systems and algorithms to map and navigate, often collectively referred to as SLAM or simultaneous localization and mapping any of which may be used in one or more embodiments of the invention. The PRA may create and store several maps having different levels of resolution, stability and/or coordinate systems including a probabilistic two-dimensional (2D) or 3D map of the robot's environment. A static map of the environment's outer perimeter (i.e. room walls or yard boundaries) may also be created. The maps are stored in RAM or non-volatile memory.

The PRA may explore the house before it begins its functional tasks, as it operates or in a combination of the two. Previously unmapped areas of the house, such as rooms that had their doors closed will be mapped as they are encountered. Parts of the house that have changed may be re-mapped as necessary. The iterative mapping process essentially comprises the steps of moving to a new position, collecting sensor data of the objects and obstacles in the immediately surrounding area, performing localization, and updating the map to incorporate information derived from the new sensor data. During exploration and the PRA's general operation, the robot identifies objects, such as certain pieces of furniture, and rooms 308 to provide additional information used in monitoring or performing functions. For example, the robot will understand the basic characteristics of a bed and know that beds are found in bedrooms. It may also recognize refrigerators as being part of the kitchen, and couches and chairs as a typical place for a person to sit down.

The robot monitors and tracks its owner using a variety of software algorithms such as facial or gate recognition. The owner may also wear a beacon such that the robot may track them even when they are out of sight. Using a neural network or other learning algorithms, the PRA combines general monitoring rules with owner specific habits to determine whether the owner is in trouble. For example, people generally sleep at night in the bedroom. The PRA will observe that the owner typically goes to bed at 10 and wakes at 7 the next morning. If the owner has not gotten out of bed by 9 or 10, the robot may attempt to wake them or call one of the emergency contacts. Similarly, the PRA will recognize a bathroom and understand that people may spend some period of time taking a shower with the door closed. It will recognize that its owner may have a problem if they remain in the bathroom for some period of time greater than normal. The process of learning and adapting the monitoring system is iterative and one or more embodiments of the invention update and refine the operational plan and emergency thresholds and response 309.

There are many well known localization and navigation algorithms that may be incorporated into the PRA. The speed and accuracy at which the robot may be able to move through a room is determined by the task requirements and the computational power of the high level electronics. Generally, the most computationally intensive part of localization is for the mobile robot to track its own position as it moves. One embodiment of the PRA uses cameras as the primary (optical) sensors. The PRA tracks its position using dead reckoning combined with any combination of one or more localization algorithms utilizing landmarks or other available information. Other embodiments can use sonar, radar, lidar, and infrared sensors, in addition to, or in place of the optical sensors. Similarly, the PRA can use any known localization method or a combination of methods rather than the dead reckoning and landmark recognition described above.

In monitoring a person, the robot will generally follow and/or observe them from a distance. Therefore, it may not be essential that it precisely know its location. The key criteria may be that it moves quickly while avoiding obstacles. In this embodiment, the PRA does not need an accurate map and may operate in rooms for which it has not previously explored. This system would require less computational capacity to travel at the same speed as a version of the system that localizes to a greater precision.

Figure 4:
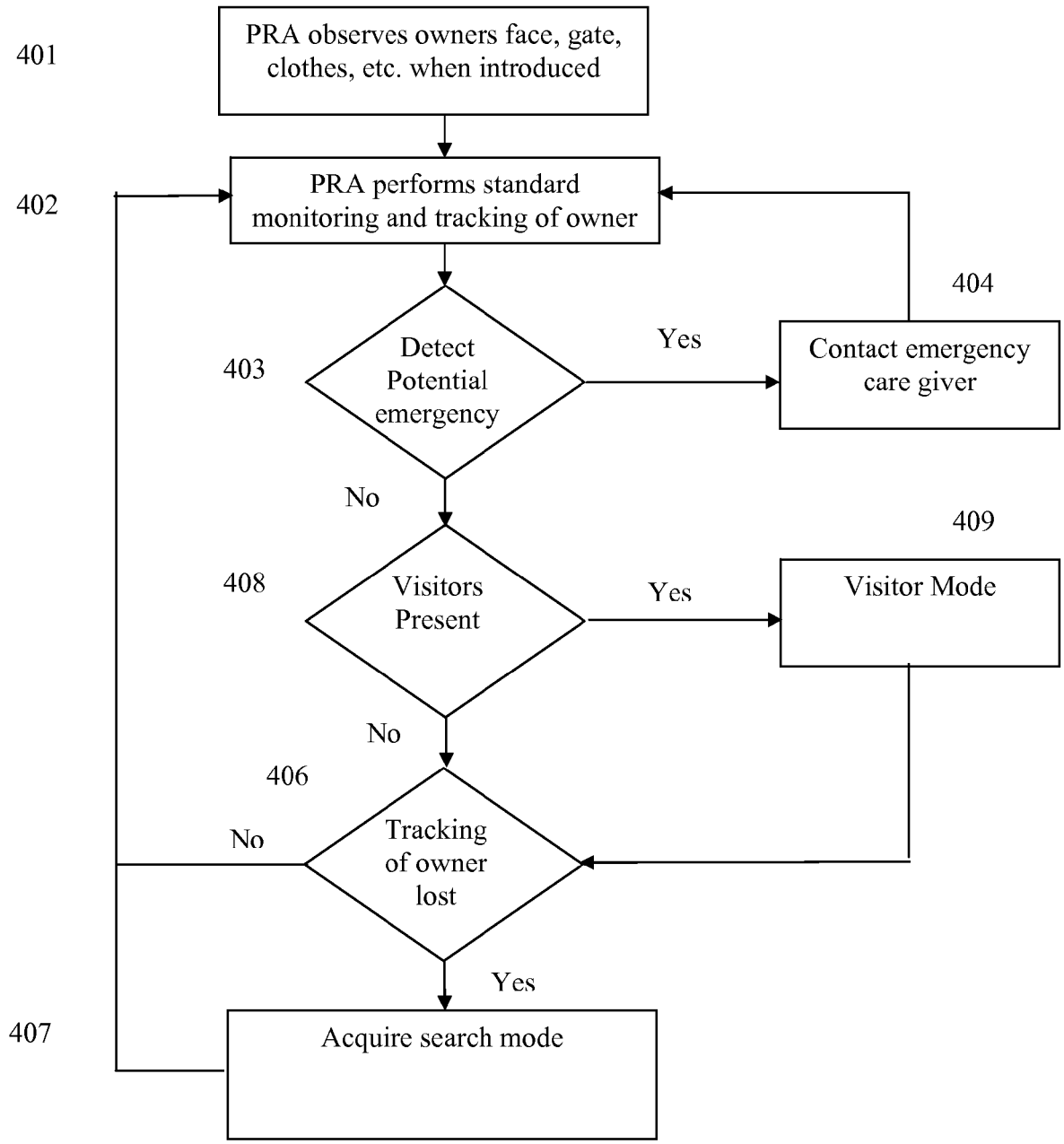
FIG. 4 is a block diagram of the logic used to determine the health and welfare of the PRA's owner.

The process of monitoring a person primarily using vision is described in FIG. 4. During the initial setup, the PRA learns to recognize its owner 401. The PRA is "introduced" to its owner either directly by its owner, or with the help of an assistant. This involves having the user or patient look into the tracking, and/or monitoring cameras for a few seconds while moving their head naturally. Additionally, the robot may watch and listen to the person while they are engaged in conversation. The PRA may also watch the person walk to learn their gate. Optionally, the owner may wear a beacon that may have a distinctive appearance or send out a radio signal. Finally, the PRA can recognize its owner by its clothes. During its introduction it identifies the color and pattern of the clothes its owner is wearing, which it will track. The PRA observes the clothing each time it sees its owner and updates the clothing list in case the person has changed clothes.

After the introduction, the PRA is ready to begin its normal tracking and monitoring operation 402. There are several simple and well know motion tracking algorithms for following the person. Use of more than one robot in performing functions is described in the inventors' U.S. Pat. No. 6,374, 155 entitled "Autonomous Multi-platform Robot System" which is hereby incorporated herein by reference. Using more than one robot to share user status, environment status or mapping information is in keeping with the spirit of the instant invention.

The robot monitors its owner based on his/her position, and facial, voice, gate and clothing recognition. Should the robot determine a potentially crisis condition 403, it will attempt to confirm by interacting with its owner or notify monitoring service 404 if an emergency situation is determined to exist. For example, if the person is mostly stationary, the robot may find an out of the way spot to watch him/her. Depending on time of day and position of patient, there is a threshold that could indicate an emergency if the person is completely still or mostly still for longer than some thresholds. Should the person remain still beyond the thresholds, the PRA will attempt to interact, notify the monitoring service and/or other emergency contacts with which it has been programmed.

The PRA monitors its owner in normal mode until it has detected the need to confirm the identity or reacquire tracking. There are several situations that might cause the PRA to lose track of its owner 406. The person has moved to a spot where the robot cannot see him/her. The person may go outside, go into a different room and shut the door, go up or down stairs, or move into another area where the robot does not have access for any other reason.

After the robot determines that it has lost track of its owner 406, it goes into Acquire Search mode 407. The robot searches the patient's home every so often to attempt to find the patient. Searching continues until a human is found. Objects are recognized as humans using one of the many standard recognition algorithms. Once a human is encountered, the PRA uses facial, gate and last known clothing recognition to determine whether the person is its owner. If so, the robot begins tracking and monitoring its owner. If the face is not the face of its owner, the current search is aborted and is retried later. If the system includes voice recognition, or the person is wearing a beacon, those signals may be used to augment the search and recognition algorithms.

Based on the map of the house and the habits that the robot has learned, the PRA may vary its search routine. If the person has gone into an area, which the robot believes has no other exit, the PRA positions itself at that area as much as possible and patrol less frequently. This is the situation if the person enters room and closes door. The PRA will give its owner privacy, but will also keep track of how long he/she is in the room and notify the monitoring service if patient doesn't come back out for a certain length of time.

Also, the PRA will attempt to determine whether the disappearance is part of a known routine, such as showering, sleeping or even leaving the house to get the newspaper or groceries. If it is a known behavior, the robot will also alter its search algorithms in order to optimize the likelihood of reacquiring its owner at the end of the activity while still providing for finding them if the current disappearance is in fact not the known behavior.

Visitors in the house may also cause the robot to lose track of its owner. When people come to visit the patient 408, the robot will generally position itself out-of-the-way such that it can watch the people. From this position, the robot may not be able to continuously monitor its owner. Because there are other people present, the PRA's algorithms may assume the visitors are capable of recognizing an emergency and allow less direct monitoring of its owner. As long as the robot may detect more than one person or a great deal of movement, it may remain in this visitor mode 409. When the movement ceases, or the guest apparently leaves, the PRA goes checks if owner tracking is lost 406 and possibly to Acquire Search mode 407. Once its owner is detected and recognized, the robot returns to normal tracking and monitoring 402.

In addition to monitoring individuals, the PRA may perform a wide variety of other tasks. A partial list of service functions is shown in FIG. 5. The services that the PRA may provide include the monitor functions 501 partially described above. While some of these functions may appeal to many individual and to parents with young children, these functions are targeted at supporting the elderly and infirmed. This group of individuals often requires specialized medical attention that the PRA may also provide 502. For example, the robot may house a medicine dispenser that tracks when medication is due and brings it to the person regardless of their location. This service eliminates the problem of the person simply forgetting to take their medication. The PRA could also track compliance and report it to a doctor, nurse or other caregiver. This compliance monitoring is important because research shows that 50% or more of the elderly patients either unintentionally or knowingly do not comply with their medication schedule. Knowing their performance may improve their treatment and health. The PRA could also house equipment to test blood pressure or blood sugar as well as providing initial dementia screening and other medical tasks.

In one embodiment, the medicine dispenser is a commercially available appliance such as the MEDport MEDGLIDER™ pill reminder and dispenser system. The pill system may be directly linked to the PRA to schedule the medicine doses. At the proper time, the robot will approach its owner and remind them of their medication. Alternatively, the PRA may not communicate directly with the pill reminder/dispenser system. The robot may be programmed directly, or it may recognize the reminders and/or alarms integrated into the system.

One function of the monitor is to contact a caregiver if there is an emergency. The telephone may also have other uses 503. The PRA may simply house a standard telephone. Since the robot may always be near its owner, the phone will always be near, so they neither have to find it or even get up to answer a call. Any function included in any telephone could also be built into the system.

The PRA may also be equipped with sensors and programmed to respond to environmental emergencies 504. Mobile smoke and carbon monoxide detectors would be located near the household occupants increasing their reliability. A thermometer would enable the PRA to detect whether the heat or air conditioning has failed before conditions can become critical. The robot may also act as a mobile sentry to detect intruders.

In addition to monitoring and safety features, many people want convenience that the PRA may perform tasks similar to those of a personal butler 505. It can detect when it is getting dark and turn on lights. It may include an internet, television or radio connection to act as a personal media center. Such a system could download audio books and other media content. Adding an arm further increases the PRA's capabilities 506. The robot could then track and pick-up, or retrieve objects such as books, keys, remote controls, etc. The PRA could also get food or drink from the refrigerator. The potential tasks are almost unlimited.

Figure 6:
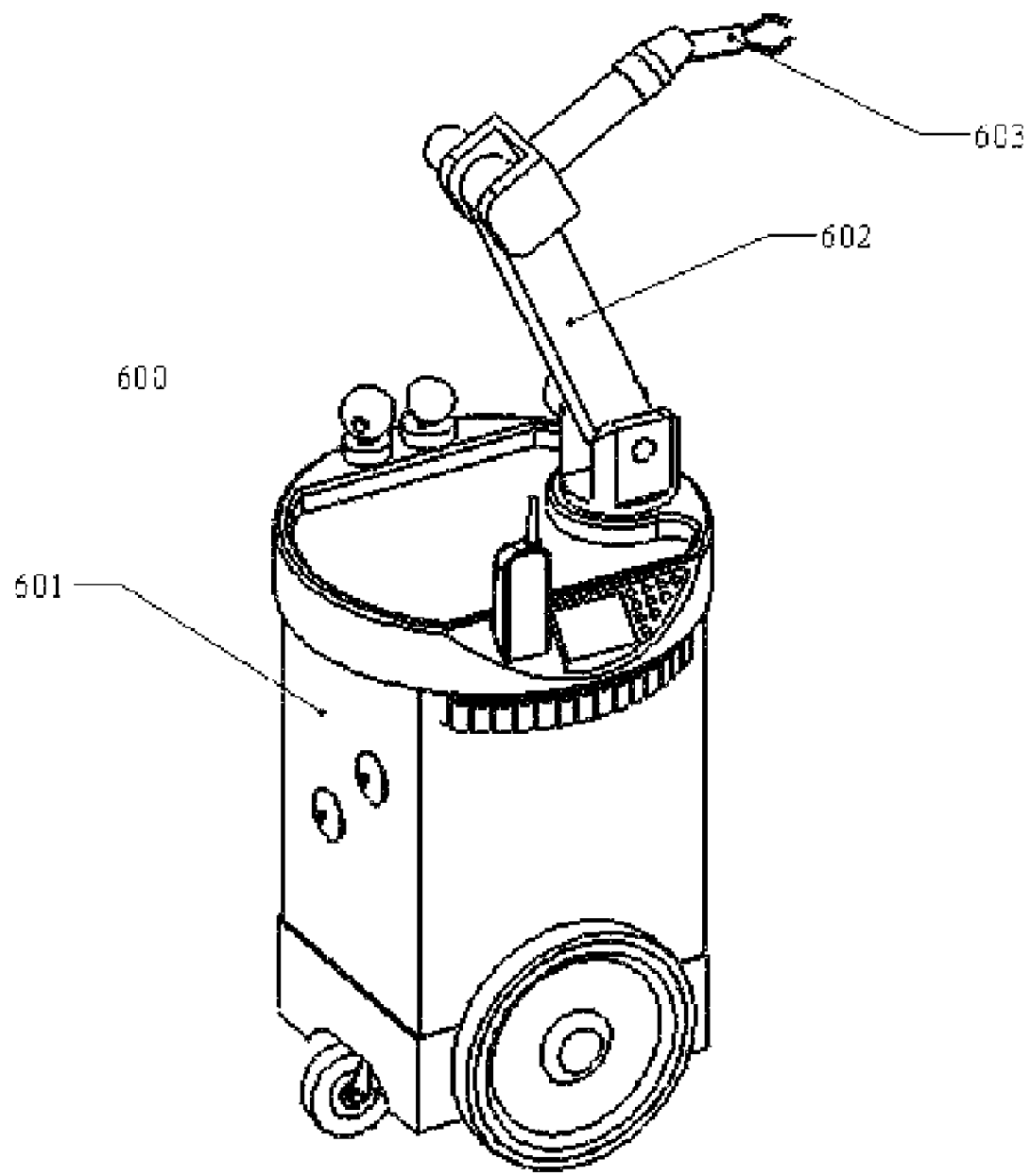
FIG. 6 is a drawing of a PRA that includes an arm.

A PRA with an arm is shown in FIG. 6. The PRA 600 includes a base unit 601 that may reflect one of the embodiments shown above or have a different design. The arm 602 should be long enough to perform its desired task. In one embodiment, the arm may pick-up objects off the ground, reach wall switches to turn on and off lights, and be able to reach into the refrigerator. If the arm is mounted near the top of a 30 inch tall base, the arm should be at least 3 feet long. The arm could be shorter if it is mounted lower. The end of the arm is equipped with a "hand" or grabbing mechanism 603, the complexity of which is dependent on the tasks to be performed. If the PRA is required to handle delicate objects, a hand comprising significant dexterity may be utilized, but if it only turns on switches, picks up soda cans and books, and finds remote controls or glasses, the hand utilized may be of a simple vise-like design.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. Many variations to the basic design are possible in other embodiments. The scope of the invention is indicated by the appended claims rather than by the foregoing description. All changes that come within the meaning and range of equivalency of the claims are to be embraced within their scope.

What is claimed is:

1. An autonomous personal service robot comprising:
a frame;
a drive system coupled with said frame and configured to move said frame;
at least one camera coupled with said frame wherein said at least one camera comprise a pair of cameras that are offset from a horizontal axis between 0 and 90 degrees,
a processor coupled with said frame and configured to operate said drive system to move said at least one camera coupled with said frame to dynamically map an environment, said processor further configured to:
identify a person stored in memory based on at least one of said person's face, gait, voice and routines using at least one image obtained from said at least one camera;
calculate a change in camera position and a change in frame position and move said frame and said at least one camera to follow said person when said person moves to a different location in a room or different room and to track and monitor said person using at least one image obtained from said at least one camera; and
determine if an out-of-ordinary event has occurred wherein said out-of-ordinary event comprises
a body of said person has remained stationary for a period of time over a threshold;
notify a third-party for intervention based on said out-of-ordinary event.

2. The apparatus of claim 1 further comprising:
a communications interface coupled with said processor; and,
said processor configured to transmit an alarm using said communications interface based on said out-of-ordinary event.

3. The apparatus of claim 1 wherein said processor is configured to learn at least one habit of said person and wherein said processor uses said at least one habit to alter a search for said person.

4. The apparatus of claim 1 wherein said processor is configured to enter search mode when said person is in an unknown position.

5. The apparatus of claim 1 wherein said processor is configured to determine if said person is in an unusual location wherein said person is sitting or laying down.

6. The apparatus of claim 1 said processor is further configured to transmit a picture taken with said at least one camera to a second person using a communications interface.

7. The apparatus of claim 1 wherein said processor is configured to enter visitor mode when a plurality of persons are detected in said environment.

8. The apparatus of claim 1 wherein said processor is configured to recognize furniture and classify a room based on said furniture in said room.

9. The apparatus of claim 1 wherein said processor is configured to remind said person of an event or to perform a task.

10. The apparatus of claim 1 wherein said out-of-ordinary event further comprises
said person has not taken medications for a second period of time over a second threshold, or
a room temperature is below a first temperature or above a second temperature, or
a carbon monoxide sample value is above a first carbon monoxide threshold.

11. The apparatus of claim 1 further comprising:
a base station configured to charge said autonomous personal service robot;
a video screen interface coupled with said processor; and,
an audio interface coupled with said processor.

12. The apparatus of claim 1 further comprising:
a medical dispenser coupled with said autonomous personal service robot and configured to dispense medication at programmable intervals.

13. The apparatus of claim 1 further comprising:
a fire extinguisher coupled with said autonomous personal service robot and configured to put out a fire as detected by a sensor coupled with said autonomous personal service robot.

14. The apparatus of claim 1 further comprising:
a blood pressure cuff coupled with said autonomous personal service robot wherein said processor is configured to obtain a blood pressure reading using said blood pressure cuff when coupled with said person.

15. The apparatus of claim 1 further comprising:
an RFID tracker configured to find an item or person comprising an RFID tag.

16. The apparatus of claim 1 further comprising:
an ultrasonic audio device coupled with said autonomous personal service robot.

17. The apparatus of claim 1, wherein said apparatus further comprises an environmental sensor configured to take a reading of an environmental measurement detected by said environmental sensor, wherein said out-of-ordinary event comprises said reading falling outside of an acceptable range for said environmental measurement.

18. The apparatus of claim 1, wherein said processor is further configured to determine a reasonable stationary period based on a time of day, a current location of said person and a habit of said person, and wherein said out-of-ordinary event comprises said person remaining stationary beyond said reasonable stationary period.

19. An autonomous personal service robot comprising:
a frame;
a drive system coupled with said frame and configured to move said frame;
at least one camera coupled with said frame wherein said at least one camera comprises a pair of cameras that are offset from a horizontal axis between 0 and 90 degrees;
a processor coupled with said frame and configured to operate said drive system to move said at least one camera coupled with said frame to dynamically map an environment, said processor further configured to:
identify a person stored in memory based on at least one of said person's face, gait, voice and routines using at least one image obtained from said at least one camera;
calculate a change in camera position and a change in frame position and move said frame and said at least one camera to follow said person when said person moves to a different location in a room or different room and to track and monitor said person using at least one image obtained from said at least one camera; and
determine if an out-of-ordinary event has occurred wherein said out-of-ordinary event comprises
a body of said person has remained stationary for a period of time over a threshold, or
said person has not taken medications for a second period of time over a second threshold, or a room temperature is below a first temperature or above a second temperature, or a carbon monoxide sample value is above a first carbon monoxide threshold;

notify a third-party for intervention based on said out-of-ordinary event.

* * * * *